Aug. 13, 1929.  M. C. SCHWEINERT  1,724,426
METHOD OF MAKING TIRE VALVES
Original Filed Feb. 27, 1922   2 Sheets-Sheet 1
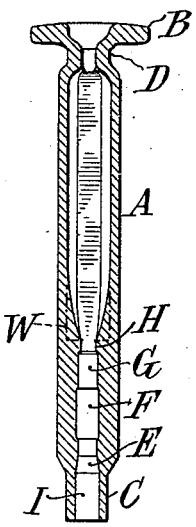
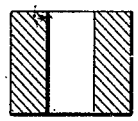
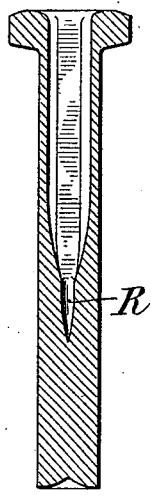
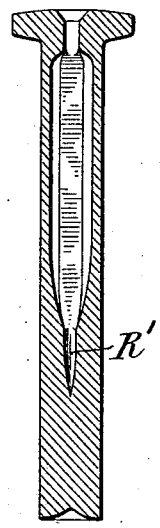
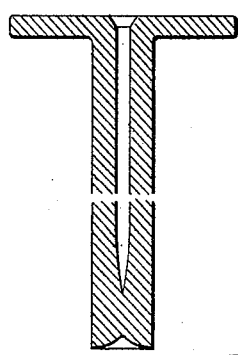
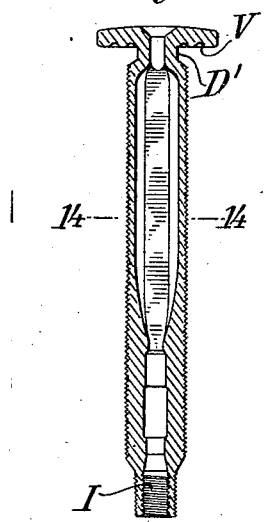
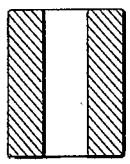
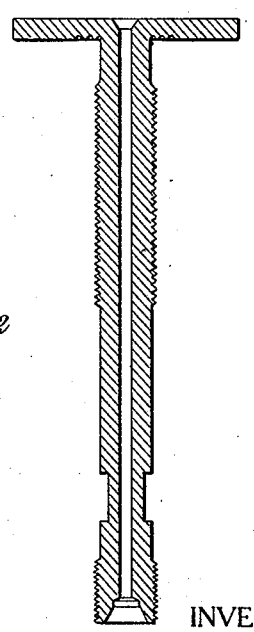
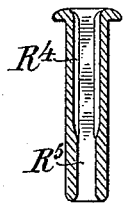
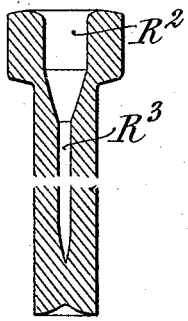
INVENTOR:
Maximilian Charles Schweinert,
By Attorneys,
Fraser, Fink & Myers Aug. 13, 1929.  M. C. SCHWEINERT  1,724,426
METHOD OF MAKING TIRE VALVES
Original Filed Feb. 27, 1922    2 Sheets-Sheet 2

INVENTOR:
Maximilian Charles Schweinert,
By Attorneys,

Patented Aug. 13, 1929.

1,724,426

UNITED STATES PATENT OFFICE.

MAXIMILIAN CHARLES SCHWEINERT, OF NEW YORK, N. Y., ASSIGNOR TO A. SCHRADER'S SON INCORPORATED, OF BROOKLYN, NEW YORK, A CORPORATION OF NEW YORK.

METHOD OF MAKING TIRE VALVES.

Application filed February 27, 1922, Serial No. 539,493. Renewed January 9, 1929.

This invention relates to valves for pneumatic tires or the like, and certain improved methods of manufacturing the same.

The present method of constructing pneumatic tire valves which is commonly employed is by forming the valve casing out of brass rod. This, of course, necessitates the use of very considerable weights of metal which in quantity production becomes relatively expensive.

One of the objects of the present invention is to construct a valve which while of sufficient strength to withstand the strains of use would economize on the quantity of metal used, and which will involve less expense in manufacture.

To this end I provide a valve casing which is formed mainly by what I may term an extrusion process. Such processes, broadly speaking, have heretofore been used in the making of lead pipe, the covering of cables with a lead jacket, etc. In proceeding with my present invention I prefer to start with a body or slug of brass, for instance, such body or slug being by preference of cylindrical form, and also by preference having a hole completely through it. This slug is placed in a die with substantially the same internal diameter as the external diameter of the slug, the die having an aperture or die hole of considerably less diameter than the die itself, and preferably arranged concentrically within the die. Initially the slug rests wholly or mainly on the shoulder thus formed. A punch or pressing device is then brought down on top of the slug, and forces the metal into the die hole, thus materially decreasing the diameter of the slug, and considerably elongating the latter. Preferably the punch carries on its under side what may be termed a former, which in the preferred form enters into the hole in the slug, such former being of a diameter which is less than the diameter of the die hole, so that as the former comes into proximity with the top of the die hole and enters the latter, the extruded metal forced downwardly by the punch is compelled to assume tubular form. Another provision of the invention which is preferably used is a means whereby the outer end of the valve casing or that end which usually receives the working parts or insides of the valve is either solid, or is provided with a passage which is of less diameter than the diameter through the body of the casing. Another way of stating this is that if the valve casing has a uniform exterior diameter, the wall of the structure when completed would be thickest at those parts which receive the valve insides. This is very desirable, because the valve insides are of standard diameter, which require in most instances a specially constructed and relatively narrow socket or passage to receive them. In constructing the valve casing in this manner I may place on the lower end of the former a projection which is of smaller diameter than the body of the former, and which, therefore, produces an extruded structure having for a portion of its length a smaller bore than that produced by the former itself. The various diameters, stroke of the press, and size of the slug are so arranged that by preference the projection on the former does not commence to actuate until a solid section of the metal has been extruded in advance at the outer end of the valve casing. While I may produce a casing having a hole from end to end, I prefer to leave the outer end of the casing solid because the necessary drilling operations in the outer end of the valve to form the socket for the valve insides are better performed in solid metal than in tubular metal, especially where it is desired to provide an enlarged valve chamber in the valve casing.

The extrusion is preferably carried to the point where there is left a body of metal within the die itself which has not been extruded, this body of metal forming the foot of the completed casing. If a considerable saving of metal is to be accomplished, the bore through the body of the valve will be so large that there is insufficient metal left just above the foot to provide for cutting away a part of this to form the usual circumferential groove which is designed to receive the edges of the aperture in the tire tube when the valve is inserted. According to the present invention I provide a valve in which there is such sufficient metal left and which nevertheless has a suitable groove for the reception of the tire tube. This may be accomplished by bending in by a pressing or spinning operation the metal of the partially finished casing until an adequate groove is formed. Or I have found that it may be accomplished by the extrusion method by leaving on the initial product a quantity of metal which is more than sufficient to constitute the foot or flange at the bottom of the finished product. I then either transfer the partially finished product to another die and press it with another punch which has a former at its bottom of substantially less diameter than that used on the first operation, and again extrude the metal. The result of this operation is that the wall of the casing is again thickened sufficiently, so that the tire tube groove may be cut in it, while still leaving an adequate thickness inwardly of the groove. This operation is best performed by the use of a press having two punches, the initial punch being held in position during the first stroke, the product then being left in the die, and the second punch provided with the small former being then brought down on the partially finished product. Or the punch and former may be constructed in such way that the former is movable in the punch, and at a certain point in the operation, the former is withdrawn at a suitable rate of speed to bring its projection back far enough so that the metal again thickens, and the diameter of the bore is lessened.

In the drawings, wherein I have illustrated various forms of the invention,—

Figure 1 is a diametrical section of a valve casing substantially completed according to one form of the invention.

Fig. 2 is a similar view of a complete valve casing constructed according to another form of the invention.

Fig. 3 is a view of an appropriate form of slug which constitutes the starting blank.

Fig. 4 is a diametrical section of one form of partially completed casing.

Fig. 5 is a similar view to Fig. 4, after the completion of the extrusion process.

Fig. 6 is a form of slug suitable for use in making the vulcanizing valve shown in Fig. 7.

Fig. 7 is a diametrical section of a partially completed vulcanizing valve.

Fig. 8 is a diametrical section of a larger vulcanizing valve completed.

Fig. 9 is a view of a partially completed short valve which may proceed in structure that shown in Fig. 7.

Fig. 10 is a view of the slug suitable for the manufacture of a valve casing known as the E. W. D. casing.

Fig. 11 is a diametrical section of the partly competed E. W. D. casing.

Fig. 12 is a diametrical section of the completed casing.

Fig. 13 is a cross section of Fig. 12.

Fig. 14 is a cross section which may be taken through the body of Fig. 2 on the line 14—14.

Figure 15:
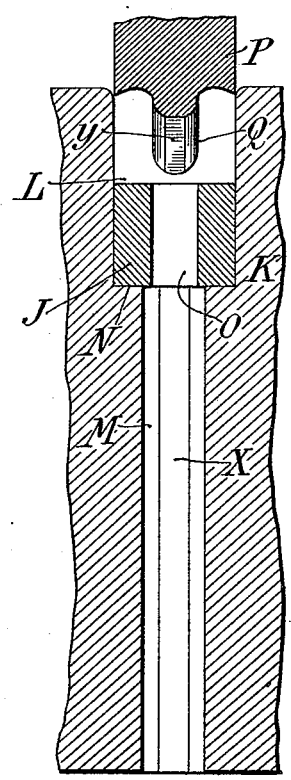

Fig. 15 is a view of a suitable punch for performing the main extrusion process.

Figure 16:
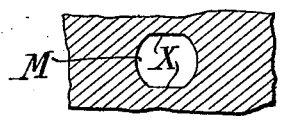

Fig. 16 is a sectional view of the die hole.

Figure 17:
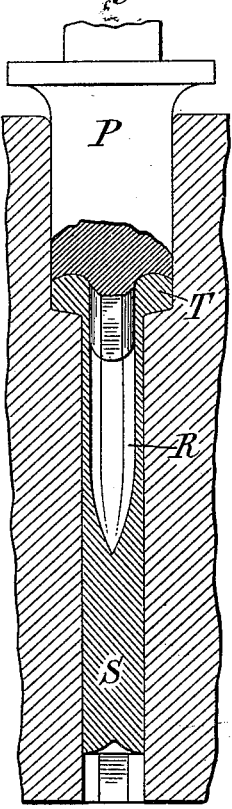

Fig. 17 shows the punch of Fig. 15 in such condition as to produce a partially completed casing similar to Fig. 4.

Figure 18:
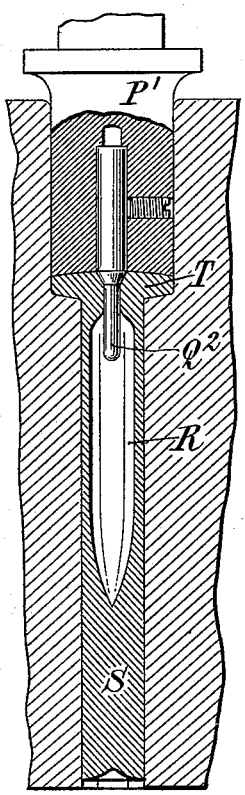

Fig. 18 is a view of the punch and die which performs the final extruding operation, producing a product similar to Fig. 5.

Figure 19:
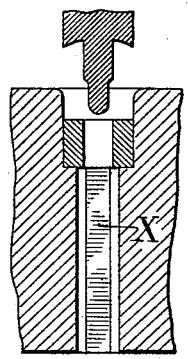

Fig. 19 is a view of a suitable form of punch for producing the structure shown in Fig. 11.

Figure 20:
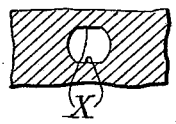

Fig. 20 is a cross section of the die hole in Fig. 19.

Figure 21:
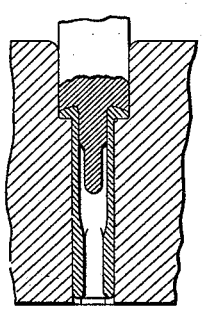

Fig. 21 shows the punch of Fig. 19 at the end of its stroke, and the blank in the condition shown in Fig. 11.

Figure 22:
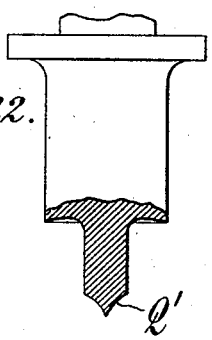

Fig. 22 is a view of punch which is suitable for producing a bore of two diameters, such as is specifically shown in Figs. 4 and 5.

Referring first to Figs. 1 and 2 of the drawings, let A indicate the valve casing as a whole which is provided at its foot with a flange B designed to be inserted within the inner tube of the tire, the nipple C designed for the reception of a valve cap or pump coupling, and a groove D which is above the foot and designed to receive the edges of the inner tube. At its outer part the valve shown is provided with a seat E for the packing of a valve inside or working parts. Inwardly of the seat E is a valve chamber F which by preference I make larger than the seat. In this valve chamber works the valve proper. Inwardly of the valve chamber F is a smaller bore indicated at G, which serves to receive the spring cup forming a part of the valve insides, and inwardly of this bore is a shoulder H upon which the spring cup rests. The parts as thus constructed are adapted to receive the well-known Schrader valve inside which, as is well known, is held in place by a screw-threaded plug, which is designed to screw into the socket I (Fig. 2).

The valve casing as thus described constitutes that type which is most largely used in the United States.

Referring now to Figs. 15, 16, 17 and 18, let J indicate the form of slug which I prefer to use in connection with my improved process. This is preferably of brass, and is preferably heated before it is placed in the die K. The die K is provided with a receiving socket L, and a die hole M, the receiving socket L being preferably of just sufficient diameter to nicely receive the slug J, and the die hole M being of the diameter designed for the finished extruded product. Between the two is a shoulder N upon which the slug J initially rests. While it is possible that the slug J shall be wholly or partially unperforated, I prefer to use a tubular slug having a bore O. The punch or pressing member P is driven by any suitable mechanism and should be of a diameter which closely fits the receiving bore L of the die. At the bottom of the punch is a former Q, which as shown in Figs. 15 and 17, is of substantially the same diameter as the bore O of the slug. When the punch descends, the former Q enters the slug, and the body of the slug is pressed downwardly, the metal flowing into the die hole M. If it is desired that the lower part of the valve casing shall be solid, the former will be of such projection or length that the metal flowing in front of it shall be sufficient to fill the die hole. Such is the structure shown in Figs. 15 and 17. As the pressing of the metal continues, however, the former comes closer to the shoulder N, and enters the die hole, with the result that the extruded metal passing around the former assumes tubular form. This tubular form may be continued so long as there remains metal to be extruded in the die. According to the preferred form of the present invention, however, I do not continue the motion of the punch sufficiently long to extrude all of the metal, but end it while there is still a substantial flange at the top of the valve casing, this flange constituting the foot of the valve. By this means I am enabled to form a valve having an integral foot at a low cast.

The diameter of the former is selected with reference to the size of the tubular walls which are desired to be left in the body of the valve. This selection depends upon the structure which is to be given to the valve casing. In the construction shown the valve is provided for a portion of its length with a large bore R which results in a very considerable saving of metal as compared with a solid valve. In producing valve casings of solid metal, the bore through the valve is drilled, and there is a very considerable amount of wastage, which has only scrap value.

It will be noted that the bore through the valve casing may be continued to the outer end without forming the solid portion S of the casing, or a bore of less diameter than the bore R may be provided, as shown, for instance at R′ in Figs. 4 and 5; in these figures the reduced bore R′ is used in connection with a solid outer end. If this is desired, the lower part of the former will be provided with a projection, and this projection may be lengthened if it is desired to continue the bore R′ to the outer end of the valve casing.

When the product has reached the shape shown in Fig. 17 it will be noted that the flange T is considerably thicker than is necessary in the finished product, and that the bore R extends completely through the foot of the valve. I, therefore, while the parts are in this condition remove the punch P and bring down another punch P′ upon the flange T, this punch P′ having a former $Q^2$ which is of smaller diameter than the former Q. When this punch descends it further extrudes the metal of the flange and forces the same inwardly so that the wall is thickened at the same time that the flange is reduced. This construction provides the necessary metal to receive the groove D′ (Fig. 2) while still retaining sufficient strength in the metal to adequately stand the strains of use. This operation also reduces the flange T to approximately the desired thickness for use. It may be afterwards grooved, as shown at V in Fig. 2, to provide for a proper clamping surface for the inner tube. After the operation of Fig. 18, the various chambers, etc. shown at E, F, G, H, and I in Figs. 1 and 2 may be made, and the nipple C may be also formed from the end of the casing by a cutting operation.

Instead of proceeding directly with the operation in Fig. 18, I may remove the product of Fig. 17 from the die, and by a punch square up the outer end of the bore R, the metal flowing forwardly and lengthening the valve structure. So also I may swage down the end of the casing to form the nipple C without loss of metal. In certain instances both of these operations may take place simultaneously.

The punching operation is indicated in the dotted lines at W in Fig. 1.

When these operations are accomplished I may roll or press the groove D (Fig. 1) into the wall of the metal instead of again extruding it. In this case the original extruding operation will be carried somewhat further in order to reduce the flange T in Fig. 17 to approximately its finished thickness.

If the valve is to have a smaller bore, as shown in Fig. 7, the former will be shaped proportionately to secure it, and if the flange is to be any other shape than round, this may be accomplished in a correspondingly formed die or a separate die. In Fig. 8 is shown a vulcanizing valve made with a small bore throughout which is produced by the use of a former of small diameter which reaches the die hole before or slightly after the metal begins extruding. In Fig. 9 is shown a partially completed valve in which the bore comprises two sections $R^2$ and $R^3$, the latter being of smaller diameter than the first. In this construction a former having a rather longer projection than is shown at Q′ in Fig. 22 is used.

In making casings of the type shown in Figs. 10 to 13, the bore $R^5$ is of slightly less diameter than bore $R^4$. In extruding this type of casing, the projection on the former is of nearly the same diameter as the former itself, and reaches the die hole either in advance or slightly after the extrusion commences. This operation is shown particularly in Figs. 19 to 21. Fig. 10 illustrates the initial blank or slug.

In all of the constructions shown according to my invention I may provide the valve casing with the exterior flats which are standard in most types of valve casings for pneumatic tires. In this event the die hole is made with flats such as are illustrated at X in Figs. 15 and 19, and, in order to save metal, the exterior of the bore, of whatever shape it may be, is given a similar flat-sided contour by making the former with flats such as are shown at Y in Fig. 15.

While I have shown and described several features of my invention, it will be understood that I do not wish to be limited thereto since various changes may be made therein without departing from the spirit of the invention.

What I claim is:

1. The method of forming a valve casing which consists in pressing a blank to extrude metal therefrom, forming said metal into tubular form by a former around which the metal flows leaving the tubular blank with an unextruded portion constituting a flange, and reducing the bore in the unextruded portion by a change in the former by further extrusion from said flange.

2. The method of forming a valve casing which consists in pressing a blank to extrude metal therefrom to form the body of the valve casing in solid form, then further extruding it past a former which forms the metal into tubular form, then changing the former to reduce the bore, and leaving part of the metal unextruded to constitute the flange.

In witness whereof, I have hereunto signed my name.

MAXIMILIAN CHARLES SCHWEINERT.